No. 651,190. Patented June 5, 1900.
R. ILGES.
RECTIFIER.
(Application filed July 19, 1898.)

(No Model.) 2 Sheets—Sheet 1.

Witnesses
M. H. Miller
R. A. Jones

Inventor
Robert Ilges.
By Howen & Howen
His Attys

THE NORRIS PETERS CO., PHOTO-LITHO., WASHINGTON, D. C.

No. 651,190. Patented June 5, 1900.
R. ILGES.
RECTIFIER.
(Application filed July 19, 1898.)
(No Model.) 2 Sheets—Sheet 2.
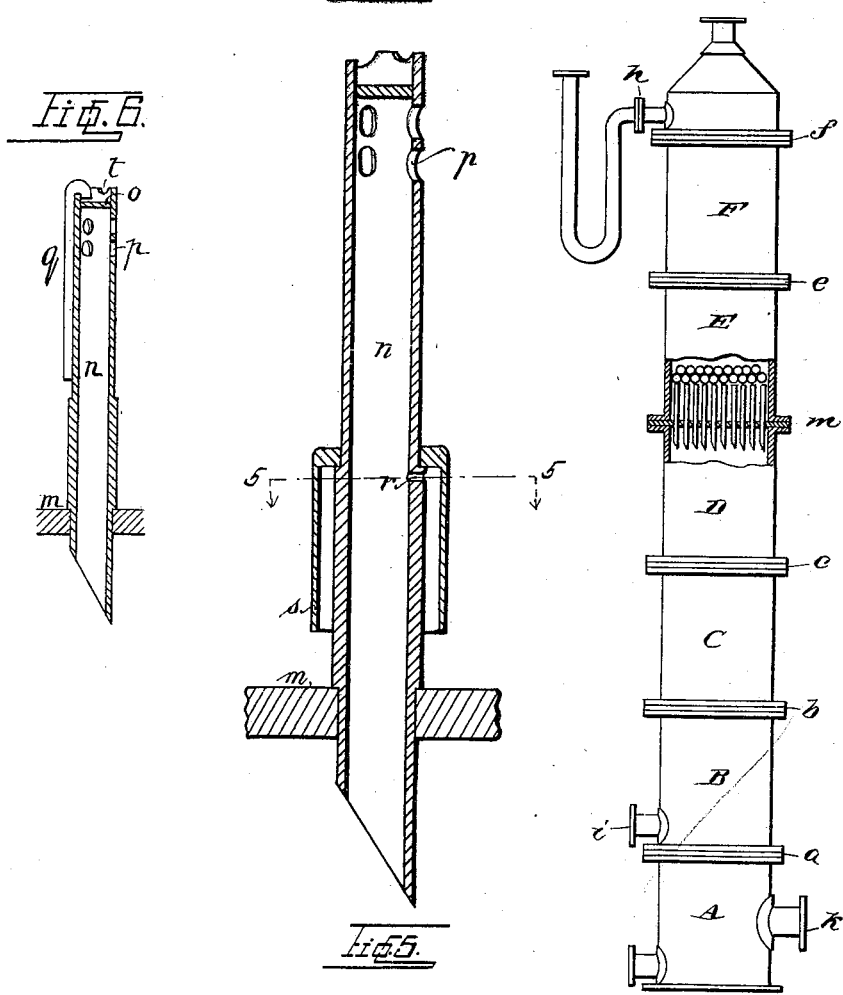
WITNESSES
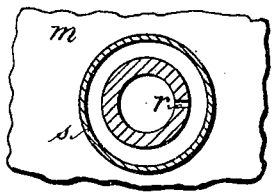
INVENTOR
Robert Ilges
BY
Howson and Howson
ATTORNEYS

UNITED STATES PATENT OFFICE.

ROBERT ILGES, OF COLOGNE, GERMANY.

RECTIFIER.

SPECIFICATION forming part of Letters Patent No. 651,190, dated June 5, 1900.

Application filed July 19, 1898. Serial No. 686,387. (No model.)

*To all whom it may concern:*

Be it known that I, ROBERT ILGES, engineer, a subject of the German Emperor, and a resident of Cologne, Germany, have invented certain new and useful Improvements in Rectifiers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Rectification on small balls contained in columns and first used by the inventor in the year 1870 can only take place energetically when the vapor flowing upward through the spaces or intervals between the balls and the low-wine trickling downward over the balls are quite uniformly divided and can therefore pass one another smoothly without hindrance. This requirement is fulfilled by the new drip plates and grates which are placed between the joints of the lengths of the column filled with balls, as shown in the accompanying drawings.

Figure 1:
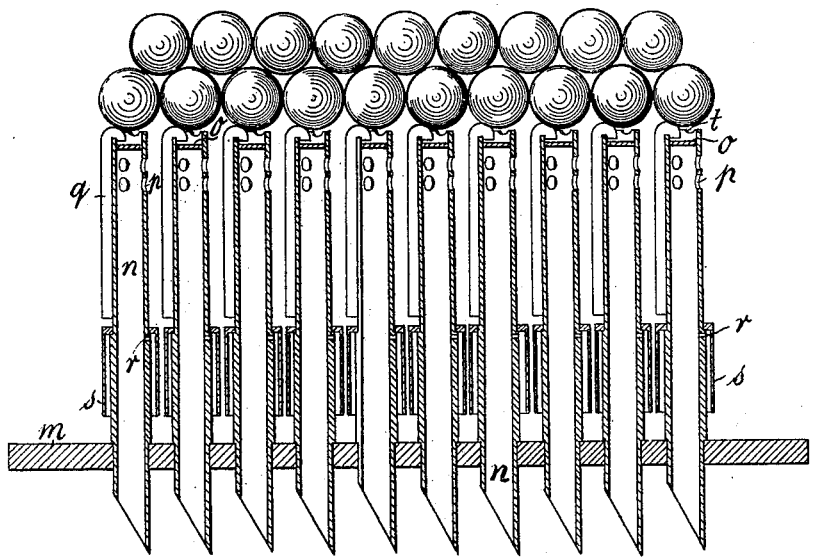
Figure 2:
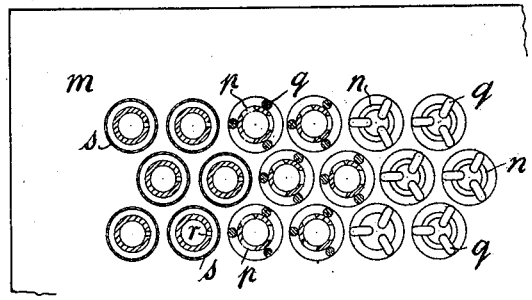

In the accompanying drawings, Figure 1 is a vertical section through one form of my improved drip and grate plate. Fig. 2 is a sectional plan view on the line 2 2, Fig. 1. Fig. 3 is a view, drawn to a smaller scale, of a rectifying-column, partly in section. Fig. 4 is an enlarged vertical section of a part of one of the drip-plates. Fig. 5 is a sectional plan on the line 5 5, Fig. 4. Fig. 6 is a view of a modification.

I will first describe in detail the construction of my improved combined drip and grate plate, as illustrated in Figs. 1 and 2. This plate has the twofold purpose of supporting the balls hereinafter mentioned and of allowing the vapors to flow upward, while the low-wine can flow downward, distributed with great uniformity, so that each ball practically shall always receive the same number and the same-sized drops of wine in the same time. In the plate $m$ are secured tubes $n$, which are to allow the vapors to pass upward and the low-wine to pass in drops downward. Near their upper ends, but at a short distance from their upper edges, these several tubes are closed by diaphragms $o$, so that a little basin is provided at the top of each tube. Below this diaphragm each tube is provided with a series of holes $p$, preferably three sets of two each. These holes serve for the upward passage of the vapors; but the low-wine dripping from the balls should be carefully kept away from these holes. For this purpose I provide a corresponding number of wires $q$, suspended by loops from the upper edge of each of the tubes. The three wires on each tube hang in corresponding notches $t$ in the upper edges of the tube; but the wires are of such thickness that they project above the top of each tube, so that the lowermost balls rest wholly upon these wires, and each of the drops of low-wine can drop from its ball into the basin at the top of the tube and thence can run over at the notches $t$ and down the wires $q$ onto the plate $m$ below. In the side of each of these tubes $n$ is formed a small hole $r$ for the downward passage of the low-wine. In order that the wine may pass in single drops, these holes $r$ are made very small. In order that the level of the wine on the plate $m$ may be at a suitable height above the holes $r$ to produce a uniform passage of the wine through the said holes and in order at the same time to protect the holes from being stopped up by foreign particles, I arrange around each of the tubes $n$ where the holes $r$ occur inverted cups or rings $s$, which compel the wine collecting on the plate $m$ to rise within these cups $s$ from below upward slowly to the holes $r$, Figs. 1 and 4. By this means the particles dripping from above onto the wires cannot reach the holes $r$. If the particles are heavier than the wine, such particles sink over the cup to the bottom. If they are lighter than the wine, they would then float on the surface of the latter and would not sink low enough to enter the protecting-cup.

By way of further explanation and to illustrate the application of my invention to a rectifying-column, I will now refer to Fig. 3, in which A, B, C, D, E, and F are the several sections or chambers of the column, between which are arranged at $a$, $b$, $c$, $d$, $e$, and $f$ plates similar to the plate $m$ described with reference to Fig. 2, and the chambers B, C, D, E, and F are to be filled with balls resting upon tubes, as described and as indicated in a diagrammatic way in Fig. 3 in the case of the chamber E. It is to be observed, however, that in the case of the bottom plate at $a$ its tubes $n$ are not provided with holes $r$ or protecting-rings $s$, as shown in Fig. 6, since from the chamber B the wine passes out at the outlet $i$. In the case of the top plate at $f$ there are no superposed balls or wires $q$, Fig. 4. The low-wine to be rectified enters at $h$, while the vapors enter the bottom chambers A at the inlet $k$.

I claim as my invention—

1. In apparatus for rectifying wine, a cross-plate having a series of vertical tubes, the said tubes having very small openings for the passage therethrough of the wine in drops and protecting-cups over the said openings, the tubes being constructed to allow the vapors to rise up through them, all substantially as described.

2. In apparatus for rectifying wine, a drip and grate plate provided with vertical tubes having very small holes, protecting-cups around said holes to allow the wine to pass through in drops, the tubes also having lateral holes near the top for the upward passage of the vapors, small basins at the tops of the tubes and wires suspended at the edges of the basins, as and for the purpose set forth.

3. In apparatus for rectifying wine, a cross-plate having vertical tubes provided at their upper ends with diaphragms and openings under the diaphragms for the upward passage of the vapors, the said diaphragm S forming basins at the upper ends of the tubes, in combination with wires suspended at the edges of the basins, and balls resting on the said wires, as and for the purpose specified.

In testimony that I claim the foregoing as my invention I have signed my name in presence of two subscribing witnesses.

ROBERT ILGES.

Witnesses:
WILLIAM H. MADDEN,
FRIEDRICH SOENNELTIN.